(12) United States Patent
Ogura

(10) Patent No.: US 12,181,669 B2
(45) Date of Patent: Dec. 31, 2024

(54) HEAD-UP DISPLAY APPARATUS IN WHICH REFLECTING MIRROR IS ROTATED

(71) Applicant: Panasonic Intellectual Property Management Co., Ltd., Osaka (JP)

(72) Inventor: Tetsuya Ogura, Kanagawa (JP)

(73) Assignee: PANASONIC AUTOMOTIVE SYSTEMS CO., LTD., Kanagawa (JP)

( * ) Notice: Subject to any disclaimer, the term of this patent is extended or adjusted under 35 U.S.C. 154(b) by 0 days.

(21) Appl. No.: 18/233,988

(22) Filed: Aug. 15, 2023

(65) Prior Publication Data

US 2023/0384591 A1 Nov. 30, 2023

Related U.S. Application Data

(63) Continuation of application No. PCT/JP2022/002627, filed on Jan. 25, 2022.

(30) Foreign Application Priority Data

Feb. 17, 2021 (JP) .................. 2021-023241

(51) Int. Cl.
*G02B 27/01* (2006.01)
*G02B 26/08* (2006.01)

(52) U.S. Cl.
CPC ..... *G02B 27/0149* (2013.01); *G02B 26/0816* (2013.01); *G02B 27/0179* (2013.01); *G02B 2027/0154* (2013.01)

(58) Field of Classification Search
CPC ............ G02B 27/0149; G02B 27/0179; G02B 27/01; G02B 26/0816; G02B 2027/0154; G02B 2027/0159; B60K 35/00
See application file for complete search history.

(56) References Cited

U.S. PATENT DOCUMENTS 8,619,369 B2 12/2013 Box et al.
9,864,197 B2 1/2018 Ishibashi et al.
(Continued)

FOREIGN PATENT DOCUMENTS

JP 2007-86226 4/2007
JP 2011-145655 7/2011
(Continued)

OTHER PUBLICATIONS

Official Communication issued in International Patent Application No. PCT/JP2022/002627, dated Apr. 19, 2022, along with an English translation thereof.
(Continued)

*Primary Examiner* — Brent D Castiaux
(74) *Attorney, Agent, or Firm* — GREENBLUM & BERNSTEIN, P.L.C.

(57) ABSTRACT

A head-up display apparatus includes: a second reflecting mirror, a first gear, and a rotating apparatus. The second reflecting mirror is rotatable around a first rotation axis C1 extending in a transversal direction. The first gear is disposed in a lower edge portion of the second reflecting mirror. The rotating apparatus includes a second gear that meshes with the first gear from below and that is rotatable around a second rotation axis C2 aligned with the first rotation axis C1. When the rotating apparatus rotates the second gear, the second reflecting mirror is rotated.

19 Claims, 8 Drawing Sheets

(56) References Cited

U.S. PATENT DOCUMENTS

| | | |
|---|---|---|
| 10,782,523 B2 | 9/2020 | Kato |
| 11,281,004 B2 | 3/2022 | Ogura |
| 2011/0141572 A1 | 6/2011 | Box et al. |
| 2017/0038587 A1 | 2/2017 | Ishibashi et al. |
| 2019/0235245 A1* | 8/2019 | Kato .................. G02B 27/0149 |
| 2019/0285889 A1* | 9/2019 | Ogura ................ G02B 19/0009 |
| 2020/0183164 A1 | 6/2020 | Kasuga et al. |

FOREIGN PATENT DOCUMENTS

| | | |
|---|---|---|
| JP | 2016-80900 | 5/2016 |
| JP | 2019-133039 | 8/2019 |
| JP | 2019-159282 | 9/2019 |
| JP | 2020-90177 | 6/2020 |
| WO | 2015/163204 | 10/2015 |

OTHER PUBLICATIONS

Official communication in corresponding Japanese patent application No. 2021-023241, dated May 28, 2024, along with English translation.

\* cited by examiner

HEAD-UP DISPLAY APPARATUS IN WHICH REFLECTING MIRROR IS ROTATED

BACKGROUND

1. Field

The present disclosure relates to a head-up display apparatus in which a reflecting mirror is rotated.

2. Description of the Related Art

The head-up display apparatus mounted on a vehicle includes a display apparatus, a flat mirror, and a reflecting mirror, and the display light emitted from the display apparatus is reflected by the flat mirror and the reflecting mirror to irradiate the windshield of the vehicle to display an image. In order to adjust the display position in the head-up display apparatus, the reflecting mirror is configured to be rotatable by a rotating apparatus. The rotating apparatus is comprised mainly of a stepping motor, a plurality of gears, and a spring. The rotating apparatus is disposed beside the reflecting mirror in order to hold and rotate the rotation axis of the reflecting mirror (see, for example, Patent literature 1).
[Patent Literature 1] JP2019-159282

A requirement for a larger display size of the head-up display apparatus also requires an increase in the size of the reflecting mirror. Due to considerations of vehicle-side components, however, it is difficult to increase the size of the housing of the head-up display apparatus. In this background, it is desirable to increase the size of the reflecting mirror while suppressing an increase in the size of the head-up display apparatus.

SUMMARY

The present disclosure addressed the issue described above, and a purpose thereof is to provide a technology to increase the size of the reflecting mirror while suppressing an increase in the size of the head-up display apparatus.

A head-up display apparatus according to an aspect of the present disclosure includes: a reflecting mirror rotatable around a first rotation axis extending in a transversal direction; a first gear disposed in a lower edge portion of the reflecting mirror; a rotating apparatus including a second gear that meshes with the first gear from below and that is rotatable around a second rotation axis aligned with the first rotation axis, wherein, when the rotating apparatus rotates the second gear, the reflecting mirror is rotated.

BRIEF DESCRIPTION OF THE DRAWINGS

Embodiments will now be described, by way of example only, with reference to the accompanying drawings that are meant to be exemplary, not limiting, and wherein like elements are numbered alike in several figures, in which.

DETAILED DESCRIPTION

Figure 1A:
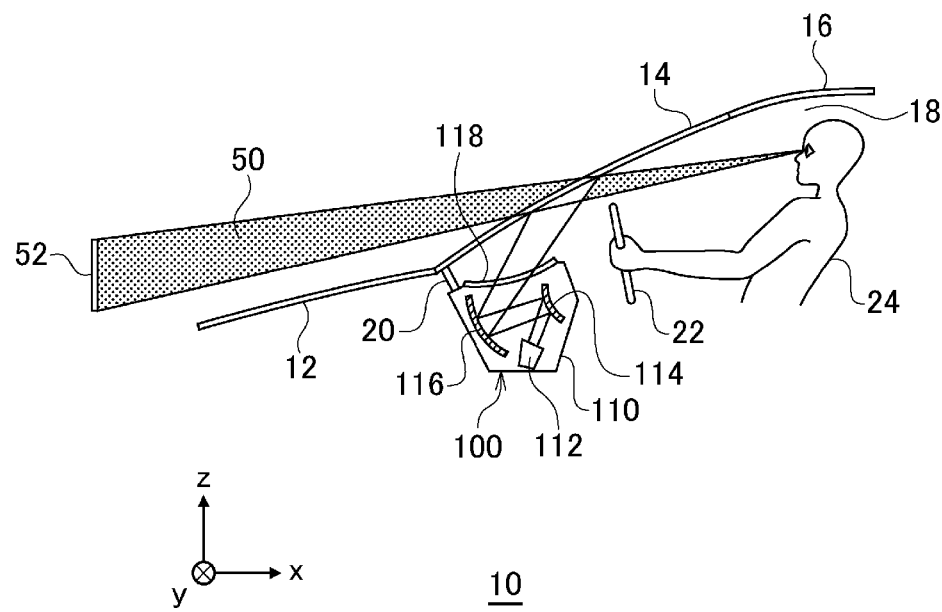
FIGS. 1A-1B show the structure of a vehicle according to an exemplary embodiment.

A summary of an exemplary embodiment will be given before describing the exemplary embodiment in specific details. The exemplary embodiment relates to a head-up display apparatus mounted on a vehicle.

The head-up display apparatus is a virtual image display apparatus that projects information as a virtual image in the driver's field of view through the windshield and supports the driver's field of view information. Head-up display apparatuses like this are classified into window shield head-up display apparatuses and combiner head-up display apparatuses. The window shield head-up display apparatus displays information on a liquid crystal panel or the like, causes the information to be reflected by the mirror, and projects the information on the windshield as a virtual image. To the driver, the image appears to be "floating" on the front hood rather than as a static image on the windshield.

In the combiner head-up display apparatus, a small, transparent plastic disk called a combiner is placed on the side of the windshield toward the interior of the vehicle, and the combiner is used as a mirror to display information in place of the windshield. Since the windshield does not need to be integrated into the optical path and the size of the apparatus is reduced, the combiner head-up display apparatus can be easily mounted on small cars and sports vehicles. Since the visual display distance of the combiner head-up display apparatus is short, however, it is necessary for the driver's eyes to get used to the distance shorter than that of the window shield head-up display apparatus. In this exemplary embodiment, a window shield head-up display apparatus will be discussed and hereinafter referred to as a head-up display apparatus.

In the head-up display apparatus, the display light output from a display apparatus such as a liquid crystal panel is reflected by the first reflecting mirror and the second reflecting mirror in the stated order and reaches the windshield. The display light reflected by the windshield forms a virtual image of the image presented by the display light in front of the windshield and transmits light from a scene in front. Thereby, the virtual image and the foreground are viewed by the driver. Depending on the driver's height, driving posture, etc., the display position of the virtual image suitable for the driver varies. To adjust the display position, the second reflecting mirror is configured to be rotatable by a rotating apparatus. When an increase in the display size of the head-up display apparatus is required, it is necessary to increase the size of the second reflecting mirror. In order to increase the size of the second reflecting mirror while suppressing an increase in the size of the head-up display apparatus, it is effective to use the vacant space under the reflecting mirror by providing the rotating apparatus in the space under the reflecting mirror. In this process, a coupling part for coupling with the rotating apparatus is provided below the reflecting mirror, and the reflective surface of the reflecting mirror and the coupling part are integrated as one component. When the reflecting mirror is made of resin, sink (a dent produced after resin molding) could occur from contact with the coupling part. This sink affects the optical performance.

In order to suppress the influence on the optical performance, the second reflecting mirror of the head-up display apparatus according to the exemplary embodiment is configured such that an offset surface that is an optically ineffective range is provided between the reflective surface that is the optical effective range and the coupling part. Since the offset surface does not contribute to reflection, sink occurring in the coupling part does not affect the optical performance. The terms "parallel" and "orthogonal" in the following description not only encompass completely parallel or orthogonal but also encompass slightly off-parallel and off-orthogonal within the margin of error. The term "substantially" means identical within certain limits.

Figure 1B:
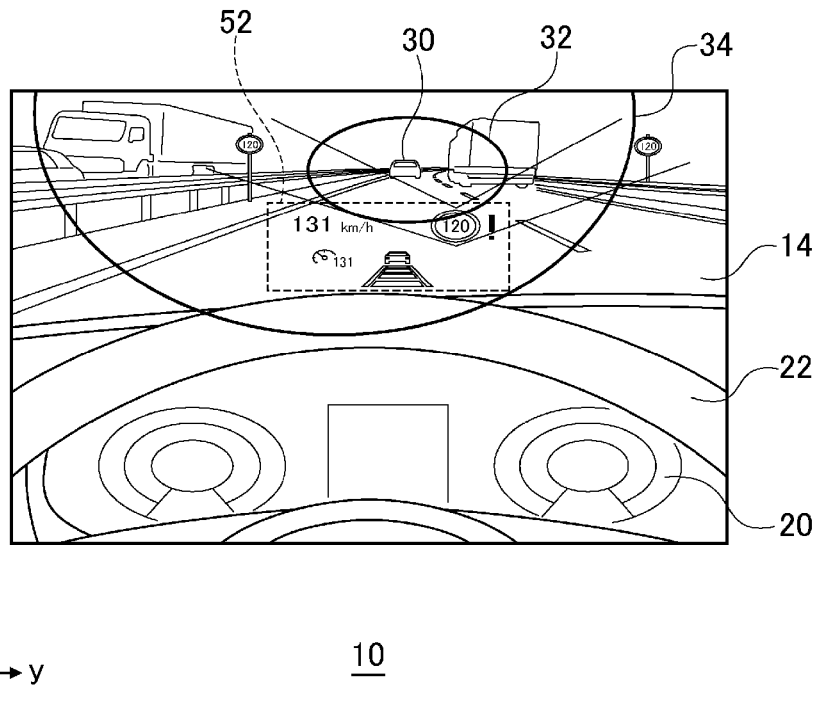

FIGS. 1A-1B show the structure of a vehicle 10 according to an exemplary embodiment. As shown in FIGS. 1A-1B, an orthogonal coordinate system formed by an x axis, y axis, and z axis is defined. The x axis and y axis are orthogonal to each other. The x-axis extends in the longitudinal direction of the vehicle 10, and the y-axis extends in the transversal direction of the vehicle 10. The z axis is perpendicular to the x axis and y axis and extends in the direction of height of the vehicle 10. The positive directions of the x axis, y axis, and z axis are defined in the directions of arrows in FIGS. 1A-1B, and the negative directions are defined in the directions opposite to those of the arrows. The positive direction of the x axis may be referred to as "rearward", "rear side", the negative direction of the x axis may be referred to as "forward", "front side", the positive direction of the y axis may be referred to as "right", "rightward", the negative direction of the y axis may be referred to as "left", "leftward", the positive direction of the z axis may be referred to as "above", "upward", and the negative direction of the z axis may be referred to as "below", "downward".

FIG. 1A is a partial cross-sectional view of the vehicle 10 viewed from left. A windshield 14 is disposed behind a hood 12, and the windshield 14 extends upward while also extending rearward. A roof 16 is disposed behind the windshield 14. The space bounded by the windshield 14 and the roof 16 is a vehicle cabin 18, a meter 20 is disposed in the front portion of the vehicle cabin 18, and a steering wheel 22 is disposed behind the meter 20. Further, a seat (not shown) is provided behind the steering wheel 22 in the vehicle cabin 18, and a driver 24 is seated in the seat. In this setup, the driver 24 sees the foreground through the windshield 14 and also sees the display on the meter 20. Since the distance from the driver 24 to the meter 20 is about 0.8 m, the driver 24 experiences a strain for focus adjustment when switching the viewpoint between the foreground through the windshield 14 and the display on the meter 20.

In the vehicle cabin 18, a head-up display apparatus 100 is fixed between the vehicle 10 and the steering wheel 22. The head-up display apparatus 100 includes a housing 110, a display apparatus 112, a first reflecting mirror 114, a second reflecting mirror 116, and an opening cover 118. The housing 110 is a case having a box-shape and having an open top, and the opened portion is covered by the opening cover 118 having translucency. The display apparatus 112 is provided in the lower portion of the housing 110, and the display apparatus 112 is, for example, a transmissive liquid crystal display or a self-luminous display comprised of a liquid crystal panel and a backlight source. The display apparatus 112 outputs a display light 50 presenting an image for giving notice of information such as various vehicle information, like vehicle traveling speed or various warnings, and navigation information.

The first reflecting mirror 114 reflects the display light 50 output by the display apparatus 112 toward the second reflecting mirror 116. The second reflecting mirror 116 further reflects the display light 50 reflected by the first reflecting mirror 114. The display light 50 reflected by the second reflecting mirror 116 passes through the opening cover 118 provided in the opening of the housing 110 and travels toward the windshield 14. The display light 50 reaching and reflected by the windshield 14 forms the virtual image 52 of the image in front of the windshield 14 and transmits light from a scene in front. Thereby, the head-up display apparatus 100 causes the driver 24 to view both the virtual image 52 and the foreground, etc. In particular, the distance from the driver 24 to the virtual image 52 is about 2 m, which is longer than the distance from the driver 24 to the meter 20. Moreover, the direction of gaze at the virtual image 52 and that of gaze at the foreground are similar. Therefore, the strain for focus adjustment when the driver switches the viewpoint between the foreground through the windshield 14 and the virtual image 52 is reduced.

FIG. 1B shows the structure of the vehicle 10 revealed when the scene in front is viewed from within the vehicle cabin 18. The meter 20 is disposed in front of the steering wheel 22, and the windshield 14 is disposed above the meter 20. Further, the foreground is viewable through the windshield 14. Since the driver 24 (not shown) focuses on a further vehicle traveling in front in the foreground, the further vehicle is regarded as a viewpoint 30. Further, the surroundings of the viewpoint 30 is regarded as an effective field of view 32, and the surroundings of the effective field of view 32 is regarded as an inductive field of view 34. The effective field of view 32 is a range in which it is possible to capture information instantly, and the inductive field of view 34 is a range in which it is possible to sense the presence of presented information. Further, the virtual image 52 is displayed in front of the windshield 14. Since the virtual image 52 is included in the effective field of view 32 and the inductive field of view 34, the driver 24 can recognize the content included in the virtual image 52 immediately.

Figure 2:
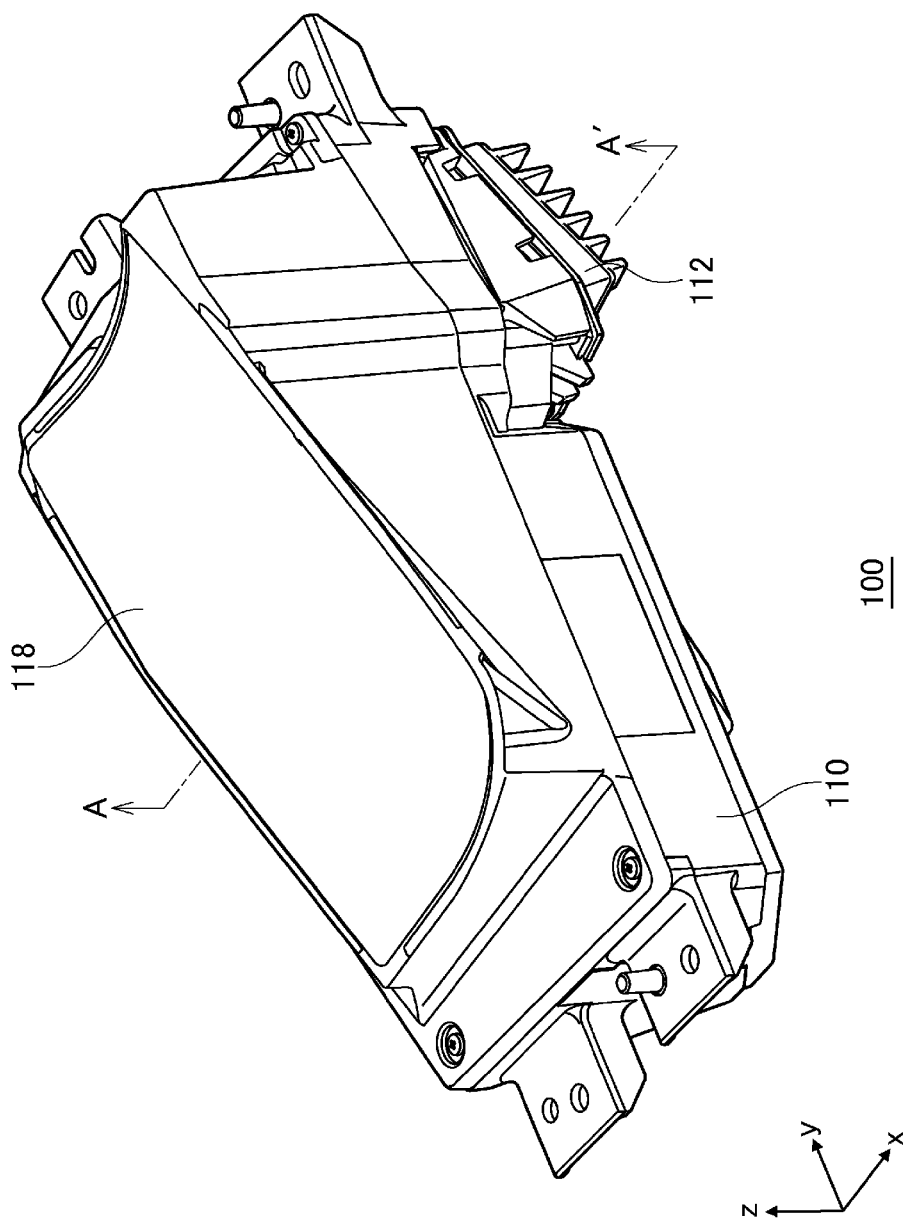
FIG. 2 is a perspective view showing the structure of the head-up display apparatus of FIG. 1A.
Figure 3:
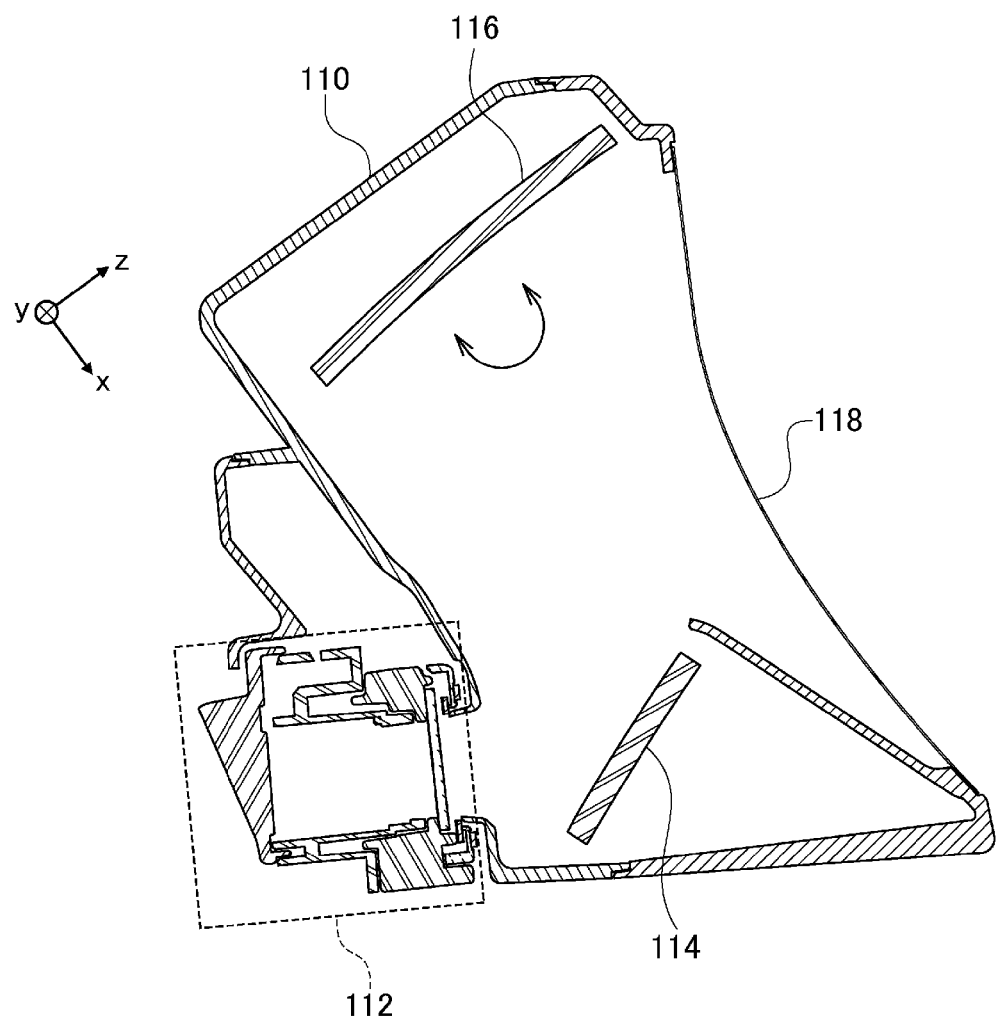
FIG. 3 is a cross-sectional view showing the structure of the head-up display apparatus of FIG. 2.

FIG. 2 is a perspective view showing the structure of the head-up display apparatus 100. FIG. 3 is a cross-sectional view showing the structure of the head-up display apparatus 100, which is a cross-sectional view along line A-A' of FIG. 2. The housing 110 has a box shape that is longer in the transversal direction than in the longitudinal direction and has a hollow shape that accommodates the first reflecting mirror 114 and the second reflecting mirror 116. The housing 110 has a mounting structure for mounting on the vehicle 10 and can be mounted on the vehicle 10. The housing 110 has open top. The housing 110 is made of a synthetic resin such as a black resin that does not have translucency. The opening of the housing 110 is covered by the opening cover 118. The opening cover 118 is made of, for example, a synthetic resin having translucency to prevent foreign matter from entering the housing 110.

The display apparatus 112 is disposed in a lower and rear portion of the housing 110. The display apparatus 112 can output the display light 50 (not shown) upward. Therefore, the display light 50 is output from the display apparatus 112 to the space inside the opening cover 118. The first reflecting mirror 114 is disposed above the display apparatus 112 so as to face the display apparatus 112 and is fixed in the housing 110. The first reflecting mirror 114 magnifies and reflects forward the display light 50 from the display apparatus 112.

The second reflecting mirror 116 is disposed in front of the first reflecting mirror 114 so as to face the first reflecting mirror 114. The second reflecting mirror 116 reflects the display light 50 from the first reflecting mirror 114 upward.

As described above, the virtual image 52 according to the display light 50 is displayed as shown in FIG. 1B. Since the display position of the virtual image 52 suitable for the driver 24, i.e., the display position of the virtual image 52 that the driver 24 can easily adjust the viewpoint to, varies depending on the driver's height, driving posture, and the like, the display position of the virtual image 52 should be adjusted in the vertical direction. To achieve this, the second reflecting mirror 116 is rotatable in the direction of the arrow in FIG. 3. In order to rotate the second reflecting mirror 116, a rotating apparatus (not shown) is disposed in the housing 110. Hereinafter, the structure of the second reflecting mirror 116 and the rotating apparatus will be described.

Figure 4:
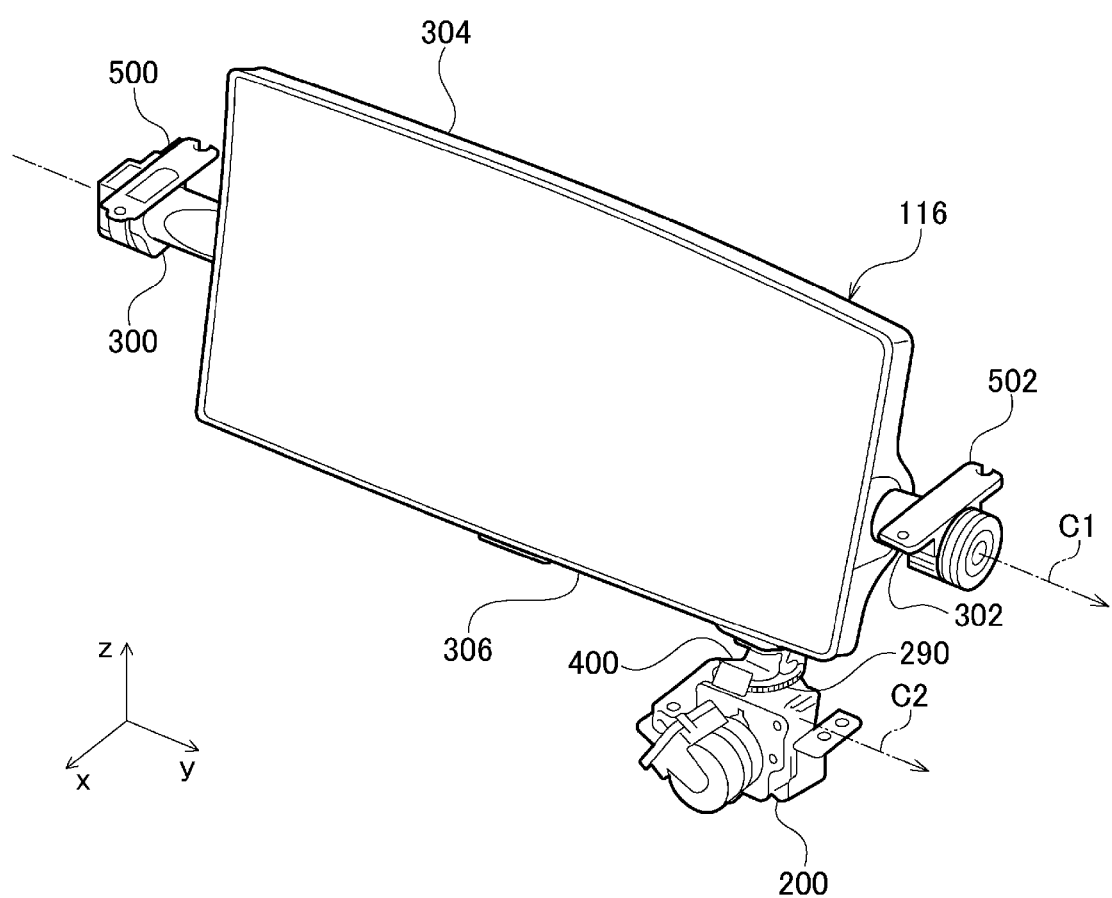
FIG. 4 is a perspective view showing the structure of the second reflecting mirror of FIG. 3 and the rotating apparatus that rotates the second reflecting mirror.

FIG. 4 is a perspective view showing the structure of the second reflecting mirror 116 and the rotating apparatus 200 that rotates the second reflecting mirror 116. The second reflecting mirror 116 includes a left shaft part 300, a right shaft part 302, and a main body 304, and a first gear 400 is attached to the second reflecting mirror 116. The rotating apparatus 200 includes a second gear 290.

The main body 304 is a concave mirror having a mirror surface on the concave side of the spherical surface. The main body 304 is a base material made of, for example, a synthetic resin material. The main body 304 has a plate shape, a left shaft part 300 protruding in a cylindrical shape is provided in the left edge portion of the main body 304, and a right shaft part 302 protruding in a cylindrical shape is provided in the right edge portion of the main body 304. The left shaft part 300 and the right shaft part 302 are aligned with a first rotation axis C1 extending in the transversal direction. The left shaft part 300 is rotatably supported by the left shaft support part 500, and the right shaft part 302 is rotatably supported by the right shaft support part 502. Therefore, the main body 304 can be rotated around the first rotation axis C1. The first gear 400 is disposed in a lower edge portion 306 of the main body 304.

The second gear 290 of the rotating apparatus 200 meshes with the first gear 400 from below. The second gear 290 is a gear rotatable around a second rotation axis C2 extending in the same transversal direction as the first rotation axis C1. The rotating apparatus 200 includes a stepping motor described later, and the second gear 290 is driven by the stepping motor to be rotated around the second rotation axis C2. The rotation of the second gear 290 moves the first gear 400 in the longitudinal direction. The movement of the first gear 400 in the longitudinal direction rotates the main body 304 around the first rotation axis C1.

That is, the rotating apparatus 200 is disposed in the space under the second reflecting mirror 116 in this exemplary embodiment in order to suppress an increase in the size of the head-up display apparatus 100 (FIGS. 2 and 3) while increasing the size of the second reflecting mirror 116. Hereinafter, the structure of the second reflecting mirror 116 and the rotating apparatus 200 will be described in further detail.

Figure 5:
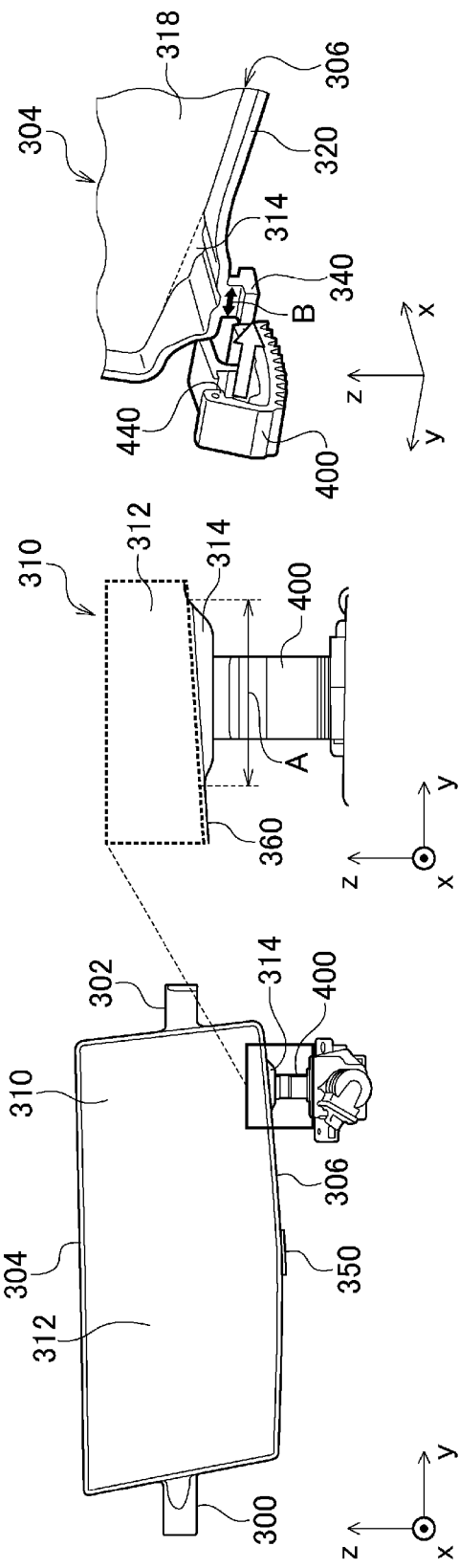
FIG. 5A-5D show the structure of the second reflecting mirror of FIG. 4.

FIG. 5A-5D show the structure of the second reflecting mirror 116. As shown in FIGS. 5A-5B, the main body 304 is disposed between the left shaft part 300 and the right shaft part 302 in the transversal direction. The concave side of the main body 304 represents a front surface 310. On the front surface 310, a mirror surface 312 that is a reflective film is formed by means such as vapor deposition. Further, an offset surface 314 is disposed below a portion of the mirror surface 312 on the front surface 310. For example, the offset surface 314 is disposed below a portion of the right side of the mirror surface 312. To describe it more specifically, the offset surface 314 is disposed between a gate 350 (described later) disposed at the center of the lower edge portion 306 and the left end of the lower edge portion 306. Further, the length "A" of the offset surface 314 in the transversal direction is longer than the length B of a coupling part 340 (described later) in the transversal direction. The offset surface 314 can be said to be an optically ineffective range with respect to the mirror surface 312, which is an optically effective range, and does not have a mirror function. For example, emboss processing is applied to the offset surface 314.

FIGS. 5C-5D show the structure revealed when the second reflecting mirror 116 is viewed from the side opposite to that of FIGS. 5A-5B. A rear surface 318 is disposed on the side opposite to the front surface 310 of FIGS. 5A-5B. In the lower edge portion 306 of the rear surface 318, that is, the lower edge portion 306 of the front surface 310, a rib 320 extending toward the rear side is formed. Ribs are not limited to the lower edge portion 306 and are also formed at the upper edge portion, the left edge portion, and the right edge portion. In this exemplary embodiment, we focus on the rib 320 formed in the lower edge portion 306. The rib 320 is organized into a first segment 330 and a second segment 332. The first segment 330 is a segment in contact with the offset surface 314, and the second segment 332 is a segment that is not in contact with the offset surface 314 and is in contact with the mirror surface 312.

Further, the first segment 330 of the rib 320 is provided with a coupling part 340 that protrudes downward from the rib 320 such that the first gear 400 can be fitted into the coupling part 340. Therefore, it can be said that the offset surface 314 is disposed above the coupling part 340. A coupled part 440 of the first gear 400 is fitted in the coupling part 340 from below. As a result, the first gear 400 is fitted into in the coupling part 340. When the first gear 400 is rotated in this assembly, the second reflecting mirror 116 is also rotated.

The left shaft part 300, the right shaft part 302, the main body 304, the rib 320, and the coupling part 340 are integrally molded with a resin. The gate 350 disposed in the center of the lower edge portion 306 of the main body 304 is the inlet of the resin during resin molding. The depth of the rib 320 in the first segment 330 in the longitudinal direction is configured to be larger than the depth of the rib 320 in the second segment 332 in the longitudinal direction. This is to dispose the coupling part 340 on the rear side rather than the front surface 310. Due to such unevenness in the depth of the rib 320, sink may occur in the vicinity of the rib 320 in the first segment 330 during molding. When the offset surface 314 is not provided unlike in the case of this exemplary embodiment, in particular, sink may occur on the mirror surface 312 in contact with the rib 320 in the first segment 330. When sink occurs on the mirror surface 312, the optical performance is deteriorated. When the offset surface 314 is provided as in the present embodiment, on the other hand, sink may occur on the offset surface 314 in contact with the rib 320 in the first segment 330. As described above, since the offset surface 314 is in an optically ineffective range, deterioration in the optical performance of the mirror surface 312 is suppressed even if sink occurs.

Figure 6:
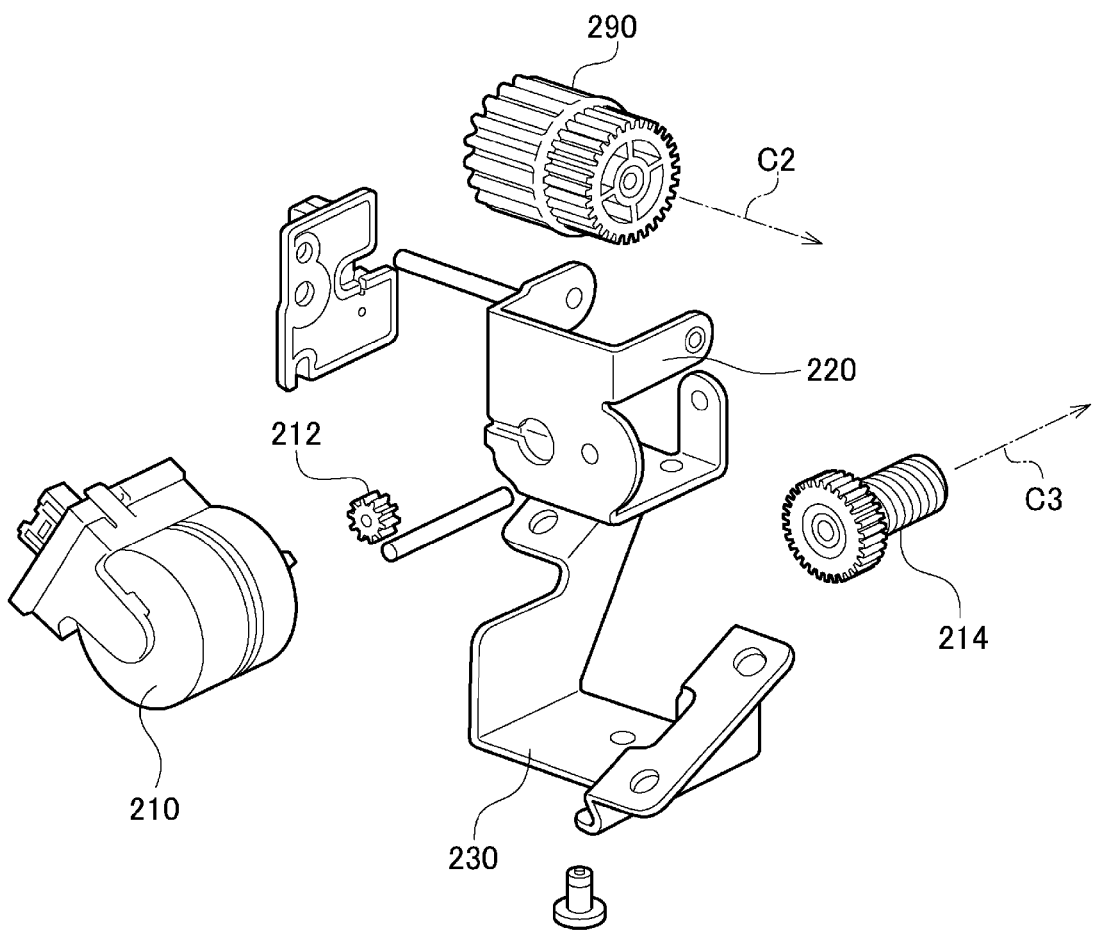
FIG. 6 is an exploded perspective view showing the structure of the rotating apparatus of FIG. 4.
Figure 7A:
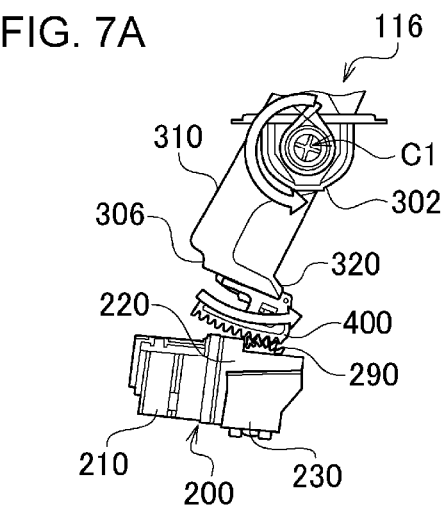
FIGS. 7A-7D show an overview of the rotation of the second reflecting mirror of FIG. 4.
Figure 7B:
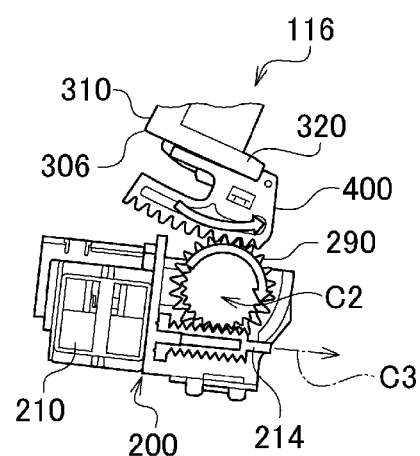
Figure 7C:
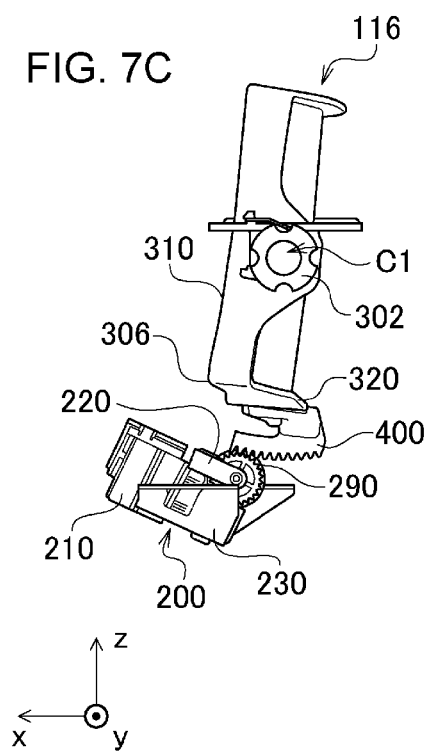
Figure 7D:
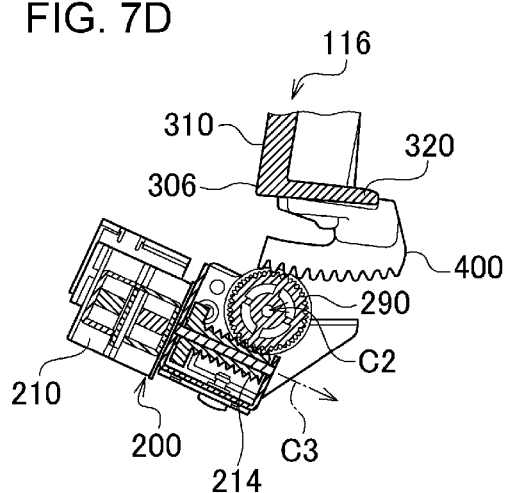

FIG. 6 is an exploded perspective view showing the structure of the rotating apparatus 200, and FIGS. 7A-7D show an overview of the rotation of the second reflecting mirror 116. In particular, FIG. 7A shows an assembly comprised of the second reflecting mirror 116 and the rotating apparatus 200 as viewed from the left side and shows a structure revealed when the second reflecting mirror 116 is moved farthest toward the front side. FIG. 7B is a cross-sectional view showing the neighborhood of the rotating apparatus 200 of FIG. 7A on an enlarged scale. FIG. 7C shows a structure in which the combination of the second reflecting mirror 116 and the rotating apparatus 200 is viewed from the left side and the second reflecting mirror 116 moves farthest to the rear side. FIG. 7D is a cross-sectional view showing the neighborhood of the rotating apparatus 200 of FIG. 7D on an enlarged scale. The rotating apparatus 200 includes a stepping motor 210, a pinion gear 212, a third gear 214, a first support part 220, a second support part 230, and a second gear 290.

The stepping motor 210 includes a protruding rod-shaped shaft (not shown). The shaft can be rotated around the rotation axis of the stepping motor 210. When a drive signal is input, the stepping motor 210 rotates the shaft so as to be at a position corresponding to the electrical angle of the drive signal. The pinion gear 212 is attached to the shaft. The pinion gear 212 is rotated around the rotation axis in association with the rotation of the shaft. The pinion gear 212 meshes with a threaded third gear 214.

The third gear 214 is rotated around the third rotation axis C3 in association with the rotation of the pinion gear 212. The third rotation axis C3 is aligned with a direction identical to that of the rotation axis of the stepping motor 210 but different from that of the second rotation axis C2 described above. The third gear 214 meshes with the second gear 290 from below. Since the third gear 214 and the second gear 290 form a worm gear in this structure, the second gear 290 is rotated around the second rotation axis C2 when the third gear 214 is rotated around the third rotation axis C3. As a result, the direction of rotation is changed. The first support part 220 supports a combination of the pinion gear 212, the third gear 214, and the second gear 290, and the second support part 230 supports the first support part 220.

As described above, the second gear 290 meshes with the first gear 400 from below. The rotation of the second gear 290 moves the first gear 400 in the longitudinal direction between the state of FIGS. 7A-7B and the state of FIGS. 7C-7D. The position of the first rotation axis C1 of the second reflecting mirror 116 and the position of the first gear 400 by which a rotational force is applied to the second reflecting mirror 116 are spaced apart from each other with the result that the torque required for the stepping motor 210 is reduced as compared with the case where a rotational force is directly applied to the first rotation axis C1 of the second reflecting mirror 116. As a result, it is possible to reduce the size of the stepping motor 210 and the rotating apparatus 200.

Figure 8:
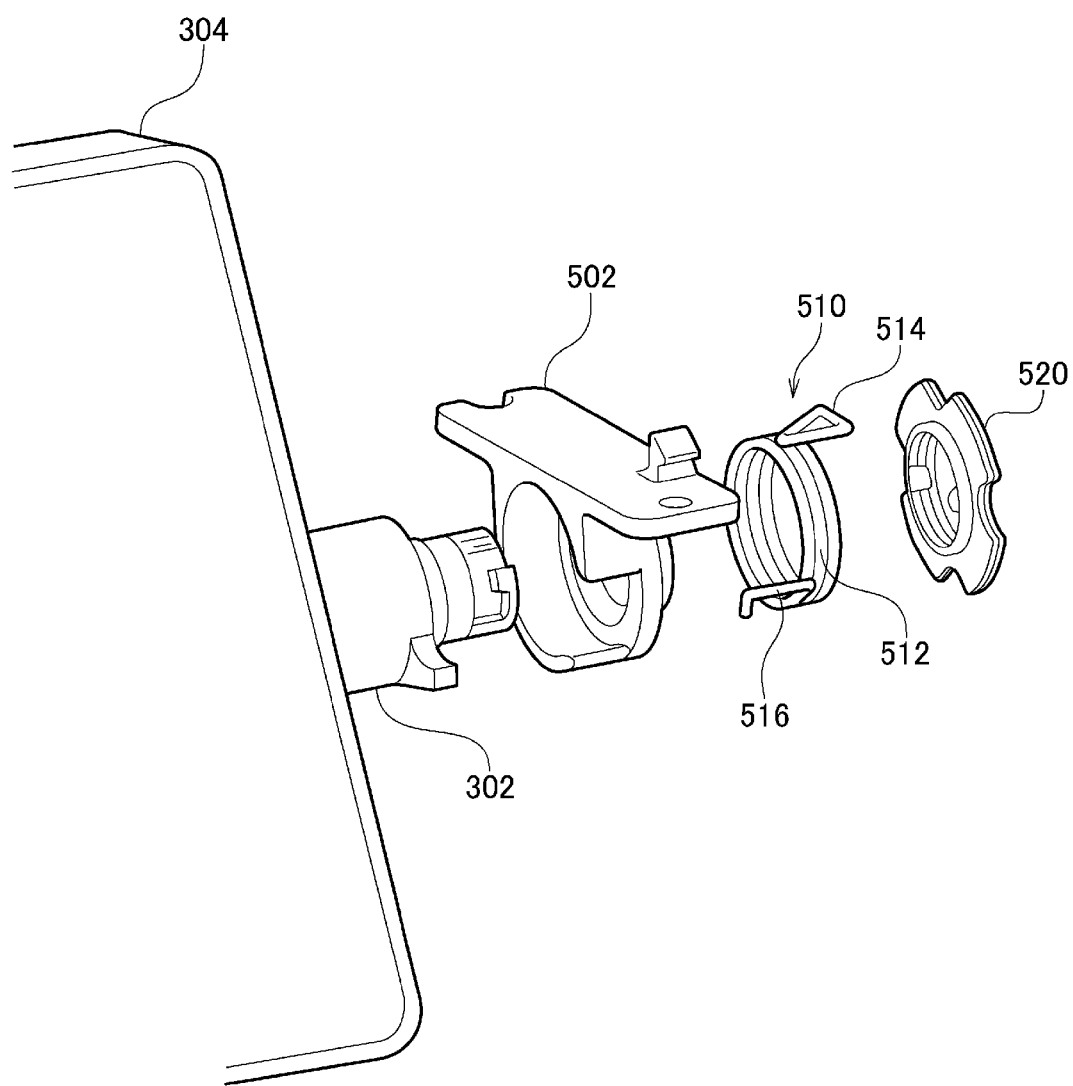
FIG. 8 shows the vicinity of the right shaft part of FIG. 4.

FIG. 8 shows the vicinity of the right shaft part 302. This may be a structure in the vicinity of the left shaft part 300. As described above, the right shaft part 302 protrudes from the right edge portion of the main body 304. The right shaft part 302 is led through a through hole provided in the right shaft support part 502 from left to right. The right shaft support part 502 is attached to the housing 110 (FIG. 3) and supports the second reflecting mirror 116.

The spring 510 is formed by, for example, processing a metal wire and has the functions of a compression spring and a torsion coil spring combined. The spring 510 is formed as one piece comprised of a winding part 512, a first arm 514, and a second arm 516. The winding part 512 has a spirally winding shape. The winding part 512 is inserted through the left shaft part 300. Further, a spring stopper 520 is attached to the end of the right shaft part 302. Therefore, the winding part 512 is sandwiched between the right shaft support part 502 and the spring stopper 520. The winding part 512 is provided in a state of being elastically deformed in the transversal direction by being sandwiched between the right shaft support part 502 and the spring stopper 520. The first arm 514 and the second arm 516 are caused to extend linearly from the ends of the winding part 512. The end of the first arm 514 is hooked to the housing 110 (FIG. 3), and the end of the second arm 516 is hooked to the right shaft part 302.

The rotation of the second reflecting mirror 116 is realized by the first gear 400 and the second gear 290 by being fit into each other and moved. In this machine element, a gap called a backlash is provided in the direction of movement of the gear teeth of the first gear 400 and the gear teeth of the second gear 290. The backlash produces a play that enables the second gear 240 to reciprocate freely between adjacent gear teeth. This play leads to rattling in the direction of rotation of the second reflecting mirror 116.

To prevent rattling in the direction of rotation, a torsion spring comprised of the first arm 514 and the second arm 516 disposed at the ends of the winding part 512 is used. That is, when a weight in the direction in which the spacing between the first arm 514 and the second arm 516 is reduced is applied to the first gear 400, the torsion spring is elastically deformed in the direction of expanding the spacing. The elastic deformation suppresses the reduction of the spacing between the first arm 514 and the second arm 516 and suppresses the movement of the position of the first gear 400. As a result, the movement of the second reflecting mirror 116 is also suppressed, and rattling in the direction of rotation the second reflecting mirror 116 is prevented.

According to this exemplary embodiment, the second gear of the rotating apparatus is caused to mesh from below with the first gear disposed in the lower edge portion of the second reflecting mirror so that the space under the second reflecting mirror can be effectively used. Further, the space under the second reflecting mirror is effectively used so that it is possible to increase the size of the reflecting mirror while suppressing an increase in the size of the head-up display apparatus. Further, an offset surface is provided below a part of the mirror surface on the front surface and above the coupling part so that occurrence of sink on the mirror surface can be suppressed. Further, since occurrence of sink on the mirror surface is suppressed, the influence on the optical performance attributable to sink can be suppressed. Further, the offset surface is configured to be longer than the coupling part so that the sink can be contained within the offset plane. In addition, emboss processing is applied so that the sink can be made less noticeable. Since the spring applies a stress to the first gear in the direction of expanding the spacing between the first arm and the second arm, occurrence of rattling due to a backlash can be suppressed. Further, the directions of the third rotation axis of the third gear and the second rotation axis of the second gear are made different so that the directions of the rotation axis of the stepping motor and the first rotation axis of the second reflecting mirror can be made different.

Further, the rotating apparatus is provided below the second reflecting mirror so that the torque required of the stepping motor can be reduced. Further, the torque required of the stepping motor is reduced so that the size of the stepping motor and the rotating apparatus can be reduced. Further, the second reflecting mirror is assembled after the wiring work of the stepping motor, etc. in the manufacturing process of the head-up display apparatus so that man-hour required for assembly can be reduced.

One aspect of the present disclosure is summarized below. A head-up display apparatus according to an aspect of the present disclosure includes: a reflecting mirror rotatable around a first rotation axis extending in a transversal direction; a first gear disposed in a lower edge portion of the reflecting mirror; a rotating apparatus including a second gear that meshes with the first gear from below and that is rotatable around a second rotation axis aligned with the first rotation axis, wherein when the rotating apparatus rotates the second gear, the reflecting mirror is rotated.

According to this aspect, the second gear of the rotating apparatus is caused to mesh from below with the first gear disposed in the lower edge portion of the reflecting mirror so that it is possible to increase the size of the reflecting mirror while suppressing an increase in the size of the head-up display apparatus.

The reflecting mirror may include: a left shaft part and a right shaft part extending along the first rotation axis; and a resin body disposed between the left shaft part and the right shaft part in the transversal direction. The main body may include: a front surface having a mirror surface and an offset surface; a rib extending from a lower edge portion of the front surface toward a rear side; and a coupling part that protrudes downward from the rib such that the first gear is adapted to be fitted into the coupling part. The offset surface is disposed below a part of the mirror surface on the front surface and above the coupling part, and a depth of the rib in a first section in contact with the offset surface is larger than a depth of the rib in a second section not in contact with the offset surface. In this case, an offset surface is provided below a part of the mirror surface on the front surface and above the coupling part, occurrence of sink on the mirror surface can be suppressed.

A length of the offset surface in the transversal direction is longer than a length of the coupling part in the transversal direction. In this case, the offset surface is configured to be longer than the coupling part so that the sink can be contained within the offset plane.

Emboss processing may be applied to the offset surface. In this case, emboss processing is applied so that the sink can be made less noticeable.

The head-up display apparatus may further include: a spring including a winding part inserted through at least one of the left shaft part or the right shaft part and a first arm and a second arm caused to extend linearly from ends of the winding part. The spring may apply a stress to the first gear in a direction of expanding a spacing between the first arm and the second arm. Since the spring applies a stress to the first gear in the direction of expanding the spacing between the first arm and the second arm, occurrence of rattling due to backlash can be suppressed.

The rotating apparatus may include: a motor; and a threaded third gear rotated around a third rotation axis aligned with a direction different from that of the second rotation axis. The third gear may mesh with the second gear from below. In this direction, the directions of the third rotation axis of the third gear and the second rotation axis of the second gear are made different so that the direction of the rotation axis of the stepping motor and the first rotation axis of the second reflecting mirror can be made different.

The present disclosure has been described above based on an exemplary embodiment. The exemplary embodiment intended to be illustrative only and it will be understood by those skilled in the art that various modifications to combinations of constituting elements and processes are possible and that such modifications are also within the scope of the present disclosure.

While various embodiments have been described herein above, it is to be appreciated that various changes in form and detail may be made without departing from the spirit and scope of the invention(s) presently or hereafter claimed.

CROSS-REFERENCE TO RELATED APPLICATION

This application is based upon and claims the benefit of priority from the prior Japanese Patent Application No. 2021-023241, filed on Feb. 17, 2021, the entire contents of which are incorporated herein by reference.

What is claimed is:

1. A head-up display apparatus comprising:
   a reflecting mirror rotatable around a first rotation axis extending in a transversal direction;
   a first gear disposed in a lower edge portion of the reflecting mirror; and
   a rotating apparatus including a second gear that meshes with the first gear from below and that is rotatable around a second rotation axis aligned with the first rotation axis, wherein
   the reflecting mirror includes:
      a left shaft part and a right shaft part extending along the first rotation axis; and
      a main body made of resin disposed between the left shaft part and the right shaft part in the transversal direction,
   the main body includes:
      a front surface having a mirror surface and an offset surface;
      a rib extending from a front lower edge portion of the front surface of the main body toward a rear side of the reflecting mirror; and
      a coupling part that protrudes downward from the rib such that the first gear is adapted to be fitted into the coupling part, wherein
      the offset surface extends downward from a part of the front lower edge portion of the front surface of the main body and above the coupling part, and
      a depth of the rib in a first section in contact with the offset surface is larger than a depth of the rib in a second section not in contact with the offset surface, and
   when the rotating apparatus rotates the second gear, the reflecting mirror is rotated.

2. The head-up display apparatus according to claim 1, wherein
   a length of the offset surface in the transversal direction is longer than a length of the coupling part in the transversal direction.

3. The head-up display apparatus according to claim 1, wherein
   emboss processing is applied to the offset surface.

4. The head-up display apparatus according to claim 2, wherein
   emboss processing is applied to the offset surface.

5. The head-up display apparatus according to claim 1, further comprising:
   a spring including a winding part inserted through at least one of the left shaft part or the right shaft part and a first arm and a second arm caused to extend linearly from ends of the winding part, wherein
   the spring applies a stress to the first gear in a direction of expanding a spacing between the first arm and the second arm.

6. The head-up display apparatus according to claim 2, further comprising:

a spring including a winding part inserted through at least one of the left shaft part or the right shaft part and a first arm and a second arm caused to extend linearly from ends of the winding part, wherein
the spring applies a stress to the first gear in a direction of expanding a spacing between the first arm and the second arm.

7. The head-up display apparatus according to claim 3, further comprising:
a spring including a winding part inserted through at least one of the left shaft part or the right shaft part and a first arm and a second arm caused to extend linearly from ends of the winding part, wherein
the spring applies a stress to the first gear in a direction of expanding a spacing between the first arm and the second arm.

8. The head-up display apparatus according to claim 4, further comprising:
a spring including a winding part inserted through at least one of the left shaft part or the right shaft part and a first arm and a second arm caused to extend linearly from ends of the winding part, wherein
the spring applies a stress to the first gear in a direction of expanding a spacing between the first arm and the second arm.

9. The head-up display apparatus according to claim 1, wherein
the rotating apparatus includes:
a motor; and
a threaded third gear rotated around a third rotation axis aligned with a direction different from that of the second rotation axis, wherein
the threaded third gear meshes with the second gear from below.

10. The head-up display apparatus according to claim 1, wherein
the rotating apparatus includes:
a motor; and
a threaded third gear rotated around a third rotation axis aligned with a direction different from that of the second rotation axis, wherein
the threaded third gear meshes with the second gear from below.

11. The head-up display apparatus according to claim 2, wherein
the rotating apparatus includes:
a motor; and
a threaded third gear rotated around a third rotation axis aligned with a direction different from that of the second rotation axis, wherein
the threaded third gear meshes with the second gear from below.

12. The head-up display apparatus according to claim 3, wherein
the rotating apparatus includes:
a motor; and
a threaded third gear rotated around a third rotation axis aligned with a direction different from that of the second rotation axis, wherein
the threaded third gear meshes with the second gear from below.

13. The head-up display apparatus according to claim 4, wherein
the rotating apparatus includes:
a motor; and
a threaded third gear rotated around a third rotation axis aligned with a direction different from that of the second rotation axis, wherein
the threaded third gear meshes with the second gear from below.

14. The head-up display apparatus according to claim 5, wherein
the rotating apparatus includes:
a motor; and
a threaded third gear rotated around a third rotation axis aligned with a direction different from that of the second rotation axis, wherein
the threaded third gear meshes with the second gear from below.

15. The head-up display apparatus according to claim 6, wherein
the rotating apparatus includes:
a motor; and
a threaded third gear rotated around a third rotation axis aligned with a direction different from that of the second rotation axis, wherein
the threaded third gear meshes with the second gear from below.

16. The head-up display apparatus according to claim 7, wherein
the rotating apparatus includes:
a motor; and
a threaded third gear rotated around a third rotation axis aligned with a direction different from that of the second rotation axis, wherein
the threaded third gear meshes with the second gear from below.

17. The head-up display apparatus according to claim 8, wherein
the rotating apparatus includes:
a motor; and
a threaded third gear rotated around a third rotation axis aligned with a direction different from that of the second rotation axis, wherein
the threaded third gear meshes with the second gear from below.

18. The head-up display apparatus according to claim 1, wherein
the offset surface is offset from a center of the front surface of the main body along the first rotation axis.

19. The head-up display apparatus according to claim 1, wherein
the rib extends rearward from an upper edge portion and side edge portions of the front surface of the main body.

* * * * *